(12) United States Patent
Perlman et al.

(10) Patent No.: US 7,885,354 B2
(45) Date of Patent: Feb. 8, 2011

(54) SYSTEM AND METHOD FOR ENHANCING NEAR VERTICAL INCIDENCE SKYWAVE ("NVIS") COMMUNICATION USING SPACE-TIME CODING

(75) Inventors: Stephen G. Perlman, Palo Alto, CA (US); Tim S. Cotter, Sunnyvale, CA (US); Mike Cheponis, Los Gatos, CA (US); Frank M. Caimi, Vero Beach, FL (US)

(73) Assignee: Rearden, LLC, San Francisco, CA (US)

(*) Notice: Subject to any disclaimer, the term of this patent is extended or adjusted under 35 U.S.C. 154(b) by 948 days.

(21) Appl. No.: 10/817,731

(22) Filed: Apr. 2, 2004

(65) Prior Publication Data

US 2005/0220207 A1    Oct. 6, 2005

(51) Int. Cl.
  *H04L 27/20* (2006.01)
(52) U.S. Cl. .................. 375/308; 375/141; 375/220; 375/260; 375/267; 375/347
(58) Field of Classification Search ............... 375/267, 375/299, 346, 347; 709/200; 455/132
See application file for complete search history.

(56) References Cited

U.S. PATENT DOCUMENTS

| | | | |
|---|---|---|---|
| 4,253,193 A | 2/1981 | Kennard et al. | |
| 4,564,935 A | 1/1986 | Kaplan | |
| 5,838,671 A | 11/1998 | Ishikawa et al. | |
| 5,872,814 A | 2/1999 | McMeekin et al. | |
| 6,252,912 B1 | 6/2001 | Salinger | |
| 6,400,761 B1 | 6/2002 | Smee et al. | |
| 6,442,151 B1 | 8/2002 | H'mimy et al. | |
| 6,473,467 B1 | 10/2002 | Wallace et al. | |
| 6,760,388 B2 | 7/2004 | Ketchum et al. | |
| 6,771,706 B2 | 8/2004 | Ling et al. | |
| 6,785,341 B2 | 8/2004 | Walton et al. | |
| 6,791,508 B2 | 9/2004 | Berry et al. | |

(Continued)

FOREIGN PATENT DOCUMENTS

EP    1 359 683 A1    11/2003

(Continued)

OTHER PUBLICATIONS

Dohler, M, et al., "A step towards MIMO: Virtual Antenna Arrays", pp. 9, European Cooperation in the field of Scientific and Technical Research, Jan. 15-17, 2003.

(Continued)

*Primary Examiner*—Shuwang Liu
*Assistant Examiner*—Dhaval Patel
(74) *Attorney, Agent, or Firm*—Blakeley Sokoloff Taylor & Zafman LLP

(57) ABSTRACT

A system and method are described in which space-time coding techniques are used to transmit and receive multiple data streams within a near vertical incidence skywave ("NVIS") communication system. Within the NVIS communication system, multiple independent data streams may be transmitted from a transmitting station at a high radiation angle, approaching or reaching 90 degrees. The data streams are reflected off of the ionosphere of the earth and received by one or more receiving stations. In one embodiment, the space-time coding techniques are multiple-input multiple-output ("MIMO") signal communication techniques.

26 Claims, 8 Drawing Sheets

U.S. PATENT DOCUMENTS

| | | | |
|---|---|---|---|
| 6,801,580 | B2 | 10/2004 | Kadous |
| 6,862,271 | B2 | 3/2005 | Medvedev et al. |
| 7,006,043 | B1 | 2/2006 | Nalbandian |
| 7,013,144 | B2 | 3/2006 | Yamashita et al. |
| 7,072,413 | B2 | 7/2006 | Walton et al. |
| 7,116,723 | B2 | 10/2006 | Kim et al. |
| 7,154,936 | B2 | 12/2006 | Bjerke et al. |
| 7,154,960 | B2* | 12/2006 | Liu et al. .................... 375/267 |
| 7,167,684 | B2 | 1/2007 | Kadous et al. |
| 7,197,082 | B2* | 3/2007 | Alexiou et al. .............. 375/260 |
| 7,197,084 | B2 | 3/2007 | Ketchum |
| 7,248,879 | B1 | 7/2007 | Walton et al. |
| 7,272,294 | B2 | 9/2007 | Zhou et al. |
| 7,310,680 | B1* | 12/2007 | Graham ...................... 709/231 |
| 7,412,212 | B2* | 8/2008 | Hottinen ..................... 455/101 |
| 7,418,053 | B2 | 8/2008 | Perlman et al. |
| 7,437,177 | B2 | 10/2008 | Ozluturk et al. |
| 2003/0043929 | A1 | 3/2003 | Sampath |
| 2003/0048753 | A1 | 3/2003 | Jalali |
| 2003/0125040 | A1 | 7/2003 | Walton et al. |
| 2003/0156056 | A1* | 8/2003 | Perry .......................... 342/82 |
| 2004/0136349 | A1 | 7/2004 | Walton et al. |
| 2004/0185909 | A1 | 9/2004 | Alexiou et al. |
| 2004/0190636 | A1 | 9/2004 | Oprea |
| 2005/0003865 | A1* | 1/2005 | Lastinger et al. ......... 455/562.1 |
| 2005/0020237 | A1* | 1/2005 | Alexiou et al. .............. 455/403 |
| 2005/0041750 | A1 | 2/2005 | Lau |
| 2005/0041751 | A1 | 2/2005 | Nir et al. |
| 2005/0043031 | A1 | 2/2005 | Cho et al. |
| 2005/0047515 | A1* | 3/2005 | Walton et al. ............... 375/267 |
| 2005/0058217 | A1 | 3/2005 | Sandhu |
| 2005/0101259 | A1 | 5/2005 | Tong et al. |
| 2005/0111599 | A1 | 5/2005 | Walton et al. |
| 2005/0169396 | A1 | 8/2005 | Baier et al. |
| 2006/0050804 | A1 | 3/2006 | Leclair |
| 2007/0082674 | A1 | 4/2007 | Pedersen et al. |

FOREIGN PATENT DOCUMENTS

| | | |
|---|---|---|
| WO | WO 03/094460 | 11/2003 |
| WO | WO 03/107582 A2 * | 12/2003 |
| WO | WO/03/107852 | 12/2003 |

OTHER PUBLICATIONS

Gesbert, D., et al., From Theory to Practice: An Overview of MIMO Space-Time Coded Wireless Systems, pp. 281-302, IEEE Journal on Selected Areas in Communications, vol. 21, No. 3, Apr. 2003.

Gesbert, D., et al., "Outdoor MIMO Wireless Channels: Models and Performance Predicition", pp. 1926-1934, IEEE Transactions on Communications, vol. 50, No. 12, Dec. 2002.

Vivato, Home page, 1 page, printed Apr. 9, 2004, http://www.vivato.net/.

HAARP, Home page, High Frequency Active Auroral Research Program, 1 page, printed Apr. 9, 2004, http://www.haarp.alaska.edu/.

Airgo, Home page, 1 page, printed Apr. 9, 2004, http://www.airgonetworks.com/.

PCT "Notification of Transmittal of the International Search Report and the Written Opinion of the International Searching Authority, or the Declaration", Application No. PCT/US05/11033 mailed May 2, 2008, 10 pages.

Office Action from U.S. Appl. No. 11/256,478, mailed Sep. 19, 2008, 14 pgs.

"Chapter 26—Electromagnetic-Wave Propagation", Reference Data for Radio Engineers, 5th Edition, Howard W. Sams & Co., Inc., (1973), 1-32.

"IntelliCell: A Fully Adaptive Approach to Smart Antennas", ArrayComm, Incorporated, WP-ISA-031502-2.0, (2002), 1-18.

Benedetto, M.D., et al., "Analysis of the effect of the I/Q baseband filter mismatch in an OFDM modem", Wireless personal communications, (2000), 175-186.

Besson, O., et al., "On parameter estimation of MIMO flat-fading channels with frequency offsets", Signal Processing, IEEE Transactions on [see also Acoustics, Speech, and Signal Processing, IEEE Transactions on], vol. 51, No. 3, (Mar. 2003), 602-613.

Catreux, Severine, et al., "Adaptive modulation and MIMO coding for broadband wireless data networks", IEEE Comm. Mag., vol. 2, (Jun. 2002), 108-115.

Chen, Runhua, et al., "Transmit selection diversity for unitary precoded multiuser spatial multiplexing systems with linear receivers", accepted to IEEE Trans. on Signal Processing, (Aug. 2005), 1-30.

Choi, L.U., et al., "A transmit preprocessing technique for multiuser MIMO systems using a decomposition approach", IEEE Trans. Wireless Comm., vol. 3, (Jan. 2004), 20-24.

Choi, Wan, et al., "Opportunistic space division multiple access with beam selection", to appear in IEEE Trans. on Communications, (May 19, 2006), 1-23.

Chu, D, et al., "Polyphase codes with good periodic correlation properties (corresp.)", IEEE Trans. Inform. Theory, vol. 18, No. 4, (Jul. 1972), 531-532.

Coulson, J, et al., "Maximum likelihood synchronization for OFDM using a pilot symbol: analysis", IEEE J. Select. Areas Commun., vol. 19, No. 12, (Dec. 2001), 2495-2503.

Dai, X, et al., "Carrier frequecy offset estimation for OFDM/SDMA systems using consecutive pilots", IEEE Proceedings—Communications, vol. 152, (Oct. 2005), 624-632.

Dietrich, Carl B., et al., "Spatial, polarization, and pattern diversity for wireless handheld terminals", Proc. IEEE Antennas and Prop. Symp., vol. 49, (Sep. 2001), 1271-1281.

Dong, Liang, et al., "Multiple-input multiple-output wireless communication systems using antenna pattern diversity", Proc. IEEE Glob. Telecom. Conf., vol. 1, (Nov. 2002), 997-1001.

Fakhereddin, M.J., et al., "Combined effect of polarization diversity and mutual coupling on MIMO capacity", Proc. IEEE Antennas and Prop. Symp., vol. 2, (Jun. 2003), 495-498.

Fletcher, P.N., et al., "Mutual coupling in multi-element array antennas and its influence on MIMO channel capacity", IEEE Electronics Letters, vol. 39, (Feb. 2003), 342-344.

Forenza, Antonio, et al., "Adaptive MIMO transmission for exploiting the capacity of spatially correlated channels", IEEE Trans. on Veh. Tech., vol. 56, n.2, (Mar. 2007), 619-630.

Forenza, Antonio, et al., "Benefit of Pattern Diversity Via 2-element Array of Circular Patch Antennas in Indoor Clustered MIMO Channels", IEEE Trans. on Communications, vol. 54, No. 5, (May 2006), 943-954.

Forenza, Antonio, et al., "Impact of antenna geometry on MIMO communication in indoor clustered channels", Proc. IEEE Antennas and Prop. Symp., vol. 2, (Jun. 2004), 1700-1703.

Forenza, Antonio, et al., "Switching Between OSTBC and Spatial Multiplexing with Linear Receivers in Spatially Correlated MIMO Channels", IEEE, (2006), 1-5.

Foschini, G.J., et al., "Simplified processing for high spectral efficiency wireless communication employing multi-element arrays", IEEE Jour. Select. Areas in Comm., vol. 17, No. 11, (Nov. 1999), 1841-1852.

Fusco, T, et al., "Blind Frequency-offset Estimation for OFDM/OQAM Systems", IEEE Transactions on [see also Acoustics, Speech, and Signal Processing, IEEE Transactions on]vol. 55, (2007), 1828-1838.

Ghogho, M, et al., "Training design for multipath channel and frequency offset estimation in MIMO systems", Signal Processing, IEEE Transactions on [see also Acoustics, Speech, and Signal Processing, IEEE Transactions on], vol. 54, No. 10, (Oct. 2006), 3957-3965.

Haring, L., "Residual carrier and sampling frequency synchronization in multiuser OFDM systems", VTC -Spring. IEEE 63rd Vehicular Technology Conference, vol. 4, (2006), 1937-1941.

Heath, Robert W., et al., "Antenna selection for spatial multiplexing systems with linear receivers", IEEE Trans. Comm., vol. 5,, (Apr. 2001), 142-144.

Heath, Robert W., et al., "Switching between diversity and multiplexing in MIMO systems", IEEE Trans. Comm., vol. 53, No. 6, (Jun. 2005), 962-968.

Jungnickel, V., et al., "Capacity of MIMO systems with closely spaced antennas", *IEEE Comm. Lett.*, vol. 7 (Aug. 2003), 361-363.

Kannan, T.P, et al., "Separation of cochannel signals under imperfect timing and carrier synchronization", *IEEE Trans. Veh. Technol.*, vol. 50, No. 1 (Jan. 2001), 79-96.

Lang, S, et al., "Design and development of a 5.25 GHz software defined wireless OFDM communication platform", *IEEE Communications Magazine*, vol. 42, No. 6, (Jun. 2004), 6-12.

Lee, K. et al., "Frequency-offset estimation for MIMO and OFDM systems using orthogonal training sequences", *IEEE Trans. Veh. Technol.*, vol. 56, No. 1, (Jan. 2007). 146-156.

Luise, M, et al., "Carrier frequency acquisition and tracking for OFDM systems", *IEEE Trans. Commun*., vol. 44, No. 11, (Nov. 1996), 1590-1598.

Luise M, et al., "Low-complexity blind carrier frequency recovery for OFDM signals over frequency-selective radio channels", *IEEE Trans. Commun.*, vol. 50, No. 7, (Jul. 2002), 1182-1188.

Mattheijssen, Paul, "Antenna-pattern diversity versus space diversity for use at handhelds", *IEEE Trans. on Veh. Technol.*, vol. 53, (Jul. 2004), 1035-1042.

McKay, Matthew R., et al., "A throughput-based adaptive MIMO -BICM approach for spatially correlated channels", *to appear in Proc. IEEE ICC*, (Jun. 2006), 1-5.

MCkay, Matthew R., et al., "Multiplexing/beamforming switching for coded MIMO in spatially correlated Rayleigh channels", *IEEE Transactions on Vehicular Technology*, vol. 56, No. 5, (Sep. 2007).

McLean, James S., et al., "A re-examination of the fundamental limits on the radiation Q of electrically small antennas", *IEEE Trans. Antennas Propagat.*, vol. 44, n.5,, (May 1996), 672-676.

Minn, et al., "A robust timing and frequency synchronization for OFDM systems", *IEEE Trans. Wireless Commun.*, vol. 2, No. 4, (Jul. 2003), 822-839.

Moose, Paul H., et al., "A technique for orthogonal frequency division multiplexing frequency offset correction", *IEEE Trans. Commun.*, vol. 42, No. 10, (Oct. 1994), 2908-2914.

Morelli, M, et al., "An improved frequency offset estimator for OFDM applications", *IEEE Commun. Lett.*, vol. 3, No. 3, (Mar. 1999), 75-77.

Morelli, M, et al., "Frequency ambiguity resolution in OFDM systems", *IEEE Commun. Lett.*, vol. 4, No. 4, (Apr. 2000), 134-136.

Morris, Matthew L. et al., "Network model for MIMO systems with coupled antennas and noisy amplifiers", *IEEE Trans. Antennas Propagat.*, vol. 53,, (Jan. 2005), 545-552.

Oberli, C, et al., "Maximum likelihood tracking algorithms for MIMOODFDM," in Communications, *IEEE International Conference on*, vol. 4, Jun. 20-24, (2004), 2468-2472.

Pohl, V., et al., "Antenna spacing in MIMO indoor channels", *Proc. IEEE Veh. Technol. Conf.*, vol. 2,, (May 2002), 749-753.

Rao, R, et al., "I/Q mismatch cancellation for MIMO-OFDM systems", In *Personal, Indoor and Mobile Radio Communications, PIMRC 2004. 15th IEEE International Symposium on*, vol. 4, (2004), 2710-2714.

Rao, R.M., et al., "Multi-antenna testbeds for research and education in wireless communications", *IEEE Communications Magazine*, vol. 42, No. 12, (Dec. 2004), 72-81.

Schmidl, T.M, et al., "Robust frequency and timing synchronization for OFDM", *IEEE Trans. Commun.*, vol. 45, No. 12, (Dec. 1997), 1613-1621.

Schuchert, S, et al., "A novel I/Q imbalance compensation scheme for the reception of OFDM signals", *IEEE Transaction on Consumer Electronics,*, (Aug. 2001).

Serpedin, E, et al., "Blind channel and carrier frequency offset estimation using periodic modulation precoders", *Signal Processing, IEEE Transactions on [see also Acoustics, Speech, and Signal Processing, IEEE Transactions on]*, vol. 48, No. 8, (Aug. 2000), 2389-2405.

Sharif, M, et al., "On the capacity of MIMO broadcast channel with partial side information", *IEEE Trans. Info. Th.*, vol. 51, (Feb. 2005), 506-522.

Shen, Zukang, et al., "Low complexity user selection algorithms for multiuser MIMO systems with block diagonalization", *accepted for publication in IEEE Trans. Sig. Proc*, (Sep. 2005), 1-12.

Shen, Aukang, et al., "Sum capacity of multiuser MIMO broadcast channels with block diagonalization", *submitted to IEEE Trans. Wireless Comm.,*, (Oct. 2005), 1-12.

Shi, K, et al., "Coarse frame and carrier synchronization of OFDM systems: a new metric and comparison", *IEEE Trans. Wireless Commun.*, vol. 3, No. 4, (Jul. 2004), 1271-1284.

Shiu, Da-Shan, et al., "Fading correlation and its effect on the capacity of multielement antenna systems", *IEEE Trans. Comm.*, vol. 48, No. 3, (Mar. 2000), 502-513.

Spencer, Quentin H., et al., "Zero-forcing methods for downlink spatial multiplexing in multiuser MIMO channels", *IEEE Trans. Sig. Proc.*, vol. 52., (Feb. 2004), 461-471.

Stoytchev, M., et al., "Compact antenna arrays for MIMO applications", *Proc. IEEE Antennas and Prop. Symp.*, vol. 3., (Jul. 2001), 708-711.

Tang, T, et al., "Joint frequency offset estimation and interference cancellation for MIMO-OFDM systems [mobile radio]", *VTC2004-Fall. 2004 IEEE 60th Vehicular Technology Conference*, vol. 3, Sep. 26-29, (2004), 1553-1557.

Tarighat, Alireza, et al., "Compensation schemes and performance analysis of IQ imbalances in OFDM receivers", *Signal Processing, IEEE Transactions on [see also Acoustics, Speech, and Signal Processing, IEEE Transactions on]*, vol. 53, (Aug. 2005), 3257-3268.

Tarighat, et al., "MIMO OFDM receivers for systems with IQ imbalances", , *IEEE Trans. Sig. Proc.*, vol. 53, *for orthogonal space-time block codes (OSTBC)*, (Sep. 2005), 3583-3596.

Tarokh, Vahid, et al., "Space-time block codes from orthogonal designs", *IEEE Trans. Info. Th.*, vol. 45, (Jul. 1999), 1456-467.

Tureli, U, et al., "OFDM blind carrier offset estimation: ESPRIT", *IEEE Trans. Commun.*, vol. 48, No. 9, (Sep. 2000), 1459-1461.

Valkama, M, et al., "Advanced methods for I/Q imbalance compensation in communication receivers", *IEEE Trans. Sig. Proc.,*, (Oct. 2001).

Van De Beek, Jan-Jaap, et al., "ML estimation of time and frequency offset in OFDM systems", *Signal Processing, IEEE Transactions on [see also Acoustics, Speech, and Signal Processing, IEEE Transactions on]*vol. 45, No. 7, (Jul. 1997), 1800-1805.

Vaughn, Rodney, et al., "Switched parasitic elements for antenna diversity", *IEEE Trans. Antennas Propagat.*, vol. 47, (Feb. 1999), 399-405.

Waldschmidt, Christian, et al., "Complete RF system model for analysis of compact MIMO arrays,", *IEEE Trans. on Vehicular Technologies*, vol. 53, (May 2004), 579-586.

Wallace, Jon W., et al., "Termination-dependent diversity performance of coupled antennas: Network theory analysis,", *IEEE Trans. Antennas Propagat.*, vol. 52, (Jan. 2004), 98-105.

Wheeler, Harold A., et al., "Small antennas", *IEEE Trans. Antennas Propagat.*, vol. AP-23, n.4, (Jul. 1975), 462-469.

Wong, Kai-Kit, et al., "A joint-channel diagonalization for multiuser MIMO antenna systems", *IEEE Trans. Wireless Comm.*, vol. 2, (Jul. 2003), 773-786.

Zheng, Lizhong, et al., "Diversity and multiplexing: a fundamental tradeoff in multiple antenna channels", *IEEE Trans. Info. Th.*, vol. 49, No. 5, (May 2003), 1073-1096.

Zhuang, X, et al., "Channel models for link and system level simulations", *IEEE 802-16 Broadband Wireless Access Working Group*, (Sep. 2004).

Notice of Allowance from U.S. Appl. No. 11/894,362, mailed Sep. 3, 2009, 6 pgs.

Notice of Allowance from U.S. Appl. No. 11/894,540, mailed Sep. 14, 2009, 6 pgs.

Notice of Allowance from U.S. Appl. No. 11/256,478, mailed Jan. 26, 2010, 6 pgs.

\* cited by examiner

3 Tx and 3 Rx Example

SYSTEM AND METHOD FOR ENHANCING NEAR VERTICAL INCIDENCE SKYWAVE ("NVIS") COMMUNICATION USING SPACE-TIME CODING

BACKGROUND OF THE INVENTION

1. Field of the Invention

This invention relates generally to the field of communication systems. More particularly, the invention relates to a system and method for enhancing a Near Vertical Incidence Skywave ("NVIS") communication channel using space-time coding techniques.

2. Description of the Related Art

Introduction

Current wireless technologies are impractical for delivering high speed two-way data signals over large geographical areas. Cellular data networks, for example, require an extremely complex and expensive infrastructure in which cellular towers are positioned every few miles. In addition, current cellular technologies only support relatively low speed data transmission. For example, the General Packet Radio Service "GPRS" used throughout Asia, Europe and North America has a theoretical maximum of only 115 Kbps, and typically operates between 10 Kbps and 35 Kbps in the real world.

Higher two-way wireless data throughput rates can be attained over large geographical areas using geosynchronous satellites. Starband and DirectWay are two such services offered today in the consumer market. However, the distance to geosynchronous satellites and back is approximately 45,000 miles round trip, resulting in an unreasonably high latency for certain types of data communications (e.g., ½ second for a typical send/receive transaction). For example, satellite communication is poorly suited for Web browsing and other types of transactions which require significant back-and-forth interaction, for voice communications which can tolerate only modest latency, and for fast-action online video games that can tolerate only very low latency. In addition, satellites are very expensive to put up and maintain. Moreover, satellite service requires a direct, unobstructed line of site to the satellite toward the south in the Northern Hemisphere or toward the north in the Southern Hemispere. Thus, users in apartments with windows facing away from the equator, near large trees or large buildings may not be candidates for geosynchronous satellite service.

Near Vertical Incidence Skywave ("NVIS")

Near Vertical Incidence Skywave ("NVIS") is a well known radio transmission technique in which a radio signal is transmitted upwards at a very high radiation angle, approaching or reaching 90 degrees (e.g., straight up), using a highly directional antenna. The radio signal is reflected off of the earth's ionosphere and directed back to the surface of the earth. Since the portion of the ionosphere which is responsible for most of the reflection (the "F2" layer) is about 150 miles high, a uniform scattering of the signal results, distributing the signal over up to a 200 mile radius around the point of transmission. This phenomenon is illustrated in FIG. 1, which shows an NVIS transmitting station 101 transmitting a radio signal to an NVIS receiving station 102 by bouncing the signal off of the ionosphere.

Unlike a satellite transmission, which is directed toward the southern horizon from the northern hemisphere, an NVIS transmission is almost straight up and the reflection is almost straight down. As such, any location with a view of the sky overhead will have a direct line of sight to the signal. Thus, the signal may be received in valleys, in cities amongst buildings, and in areas with significant tree coverage.

One of the limitations of NVIS is that it only works with radio signals having frequencies up to about 24 MHz, but typically below 10 MHz. There is very little available spectrum at these low frequencies and, as such, only very low bandwidths that can be achieved using standard transmission techniques. Although a few AM radio and shortwave radio broadcasts could be provided using NVIS, standard NVIS techniques alone would not be sufficient to provide meaningful digital bandwidth to a large number of subscribers.

Space-Time Coding of Communication Signals

A relatively new development in wireless technology is known as spatial multiplexing and space-time coding. One particular type of space-time coding is called MIMO for "Multiple Input Multiple Output" because several antennae are used on each end. By using multiple antennae to send and receive, multiple independent radio waves may be transmitted at the same time within the same frequency range. The following articles provide an overview of MIMO:

*IEEE JOURNAL ON SELECTED AREAS IN COMMUNICATIONS*, VOL. 21, NO. 3, APRIL 2003: "From Theory to Practice: An Overview of MIMO Space—Time Coded Wireless Systems", by David Gesbert, Member, IEEE, Mansoor Shafi, Fellow, IEEE, Da-shan Shiu, Member, IEEE, Peter J. Smith, Member, IEEE, and Ayman Naguib, Senior Member, IEEE.

IEEE TRANSACTIONS ON COMMUNICATIONS, VOL. 50, NO. 12, DECEMBER 2002: "Outdoor MIMO Wireless Channels: Models and Performance Prediction", David Gesbert, Member, IEEE, Helmut Bölcskei, Member, IEEE, Dhananjay A. Gore, and Arogyaswami J. Paulraj, Fellow, IEEE.

Fundamentally, MIMO technology is based on the use of spatially distributed antennas for creating parallel spatial data streams within a common frequency band. The radio waves are transmitted in such a way that the individual signals can be separated at the receiver and demodulated, even though they are transmitted within the same frequency band, which can result in multiple statistically independent (i.e. effectively separate) communications channels. Thus, in contrast to standard wireless communication systems which attempt to inhibit multi-path signals (i.e., multiple signals at the same frequency delayed in time, and modified in amplitude and phase), MIMO can rely on uncorrelated or weakly-correlated multi-path signals to achieve a higher bandwidth and improved signal-to-noise radio within a given frequency band. By way of example, using MIMO technology within an 802.11g system, Airgo Networks was recently able to achieve 108 Mbps in the same spectrum where a conventional 802.11g system can achieve only 54 Mbps (see http://www.airgonetworks.com).

Directional Antennae

Direction antennae have been in use for many decades. Such antennae come in many forms, from antennae that are directional due to their fixed physical structure, such as dish antennae commonly used in satellite communications, to antennae that are directional due to signal phasing and other manipulation, such as phased-array antennae, and there are many variations in between.

In many HF band applications, directional antennae are often used to achieve certain skywave propagation behavior (e.g. NVIS antennae are typically directional in the vertical direction to bounce back downward, and short-wave radio station antennae may be directional at an angle to maximize skywave skipping). In other HF band applications phased-array antennae are used to focus the radio signal beam on a certain spot on the ionosphere, often for research purposes. E.g, the High Frequency Active Auroral Research Program (HMRP) in Alaska (www.haarp.alask.edu) utilizes large phased-array antennae in the HF band for such purposes.

SUMMARY OF THE INVENTION

A system and method are described in which space-time coding techniques and directional antenna techniques are used to transmit and receive multiple data streams within a near vertical incidence skywave ("NVIS") communication system. Within the NVIS communication system, multiple independent data streams (or partially independent streams) are transmitted from a transmitting station at a high radiation angle, approaching or reaching 90 degrees. The data streams are reflected off of the ionosphere of the earth and received by one or more receiving stations. In one embodiment, the space-time coding techniques are multiple-input multiple-output ("MIMO") signal processing techniques.

BRIEF DESCRIPTION OF THE DRAWINGS

A better understanding of the present invention can be obtained from the following detailed description in conjunction with the drawings, in which.

DETAILED DESCRIPTION OF PREFERRED EMBODIMENTS

Figure 1:
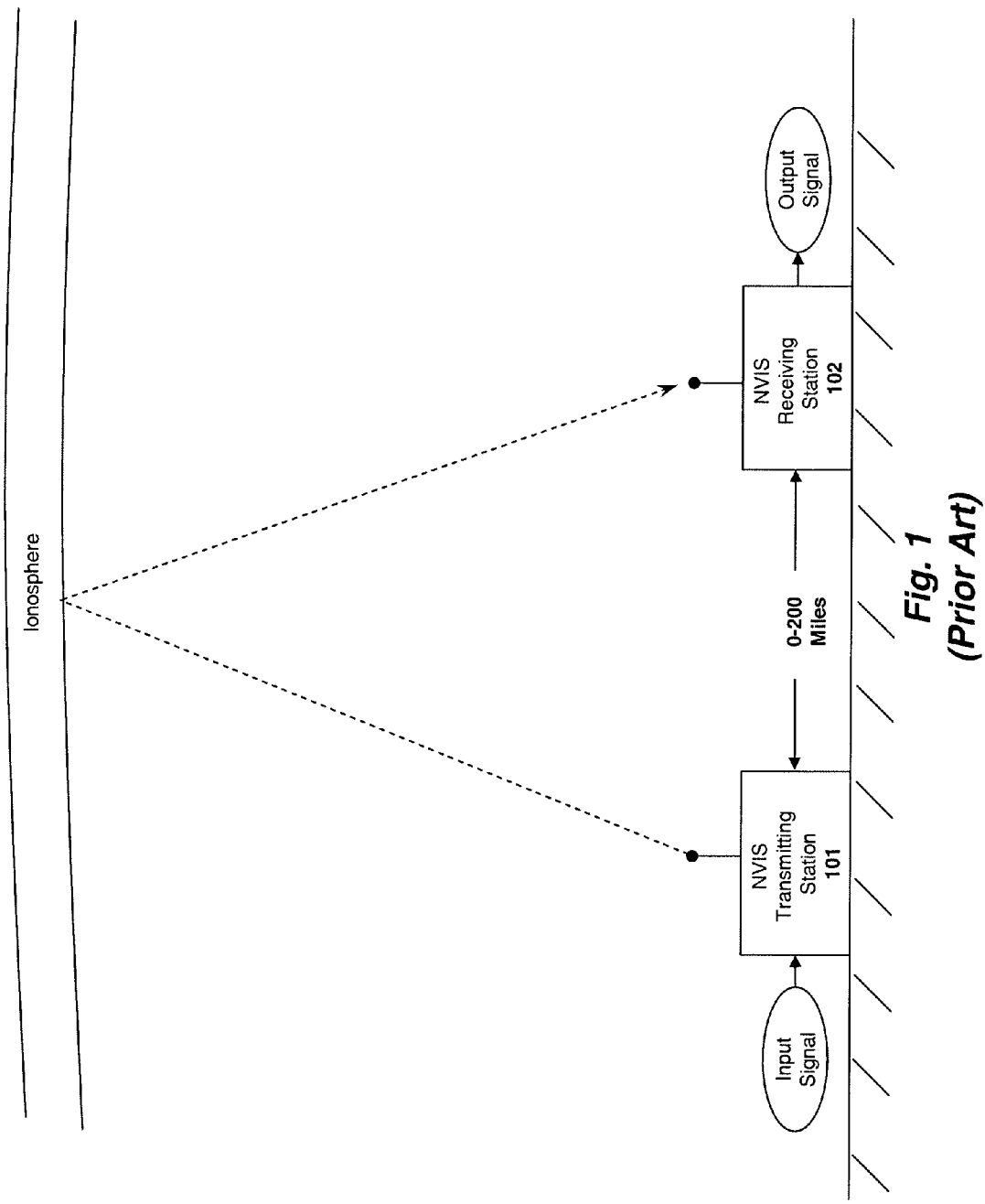
FIG. 1 illustrates a prior art Near Vertical Incidence Skywave ("NVIS") system.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the invention.

EMBODIMENTS OF THE INVENTION

One embodiment of the invention employs Multiple Input Multiple Output ("MIMO") signal transmission techniques to increase the signal-to noise ratio and transmission bandwidth within a Near Vertical Incidence Skywave ("NVIS") system. Specifically, referring to FIG. 2, in one embodiment of the invention, a first NVIS station 101 equipped with a matrix of N MIMO directional antennae 102 is configured to communicate with another NVIS station 103 equipped with a matrix of M MIMO directional antennae 104. The directional antennae 102 and 104 are each directed upward to within about 15 degrees of vertical in order to achieve the desired NVIS and minimize ground wave interference effects. In one embodiment, the two sets of directional antennae, 102 and 104, support multiple independent data streams 106 at a designated frequency within the NVIS spectrum (e.g., at a carrier frequency at or below 23 MHz, but typically below 10 MHz), thereby significantly increasing the bandwidth at the designated frequency (i.e., by a factor proportional to the number of statistically independent data streams).

The NVIS antennae serving a given station may be physically very far apart from each other. Given the long wavelengths below 10 MHz and the long distance traveled for the signals (as much as 300 miles round trip), physical separation of the antennae by 100s of yards, and even miles, can provide advantages in diversity. In such situations, the individual antenna signals could be brought back to a centralized location to be processed using conventional wired or wireless communications systems. Alternatively, each antenna can have a local facility to process its signals, then can use conventional wired or wireless communications systems to communicate the data back to a centralized location.

In one embodiment of the invention, NVIS Station 101 has a broadband link to the Internet, and NVIS Station 103 has a link to a local network (for example, within a residence). Utilizing the broadband NVIS link achieved by using MIMO, a user connected to Local Network 130, would have a broadband connection to the Internet, by connecting through link 116, uplinking through NVIS Station 103, connecting to NVIS Station 101, then reaching the Internet 110 through Link 115. This link would be accomplished even if NVIS Station 103 were as much as 200 miles from NVIS Station 101. Although such a connection would be possible using conventional NVIS techniques, the bandwidth would be extremely low compared to what was achievable through MIMO.

One embodiment of the invention employs multiple client sites served by a single server center. Specifically, referring to FIG. 3, in one embodiment of the invention an NVIS ISP 301 (typically with a connection to the Internet like NVIS Station 101 in FIG. 2) provides connectivity to multiple NVIS Client sites (two NVIS Client Sites, 303 and 305, are shown in this example, but hundreds or thousands, or possibly millions, of client sites could be served simultaneously), Each NVIS Client site 303 or 305 provide some local network connectivity, such as a local network 130 of FIG. 2, or directly provide connectivity to a data receiver and/or transmitter device (e.g. a server, a telephone, a television set, etc.). The NVIS Client Sites 303 and 305 could be located as much as 200 miles from the NVIS ISP 301.

Various different values of N and M may be employed while still complying with the underlying principles of the invention. For example, in one embodiment, N>M. Although there would no longer be a 1:1 correlation between the number of transmitting and receiving antennae, the diversity is utilized to improve signal to noise ratio ("SNR") or to establish statistically independent channels, and thereby increase channel capacity. Alternatively, in one embodiment, N<M and again, diversity will increase channel capacity.

Figure 2:
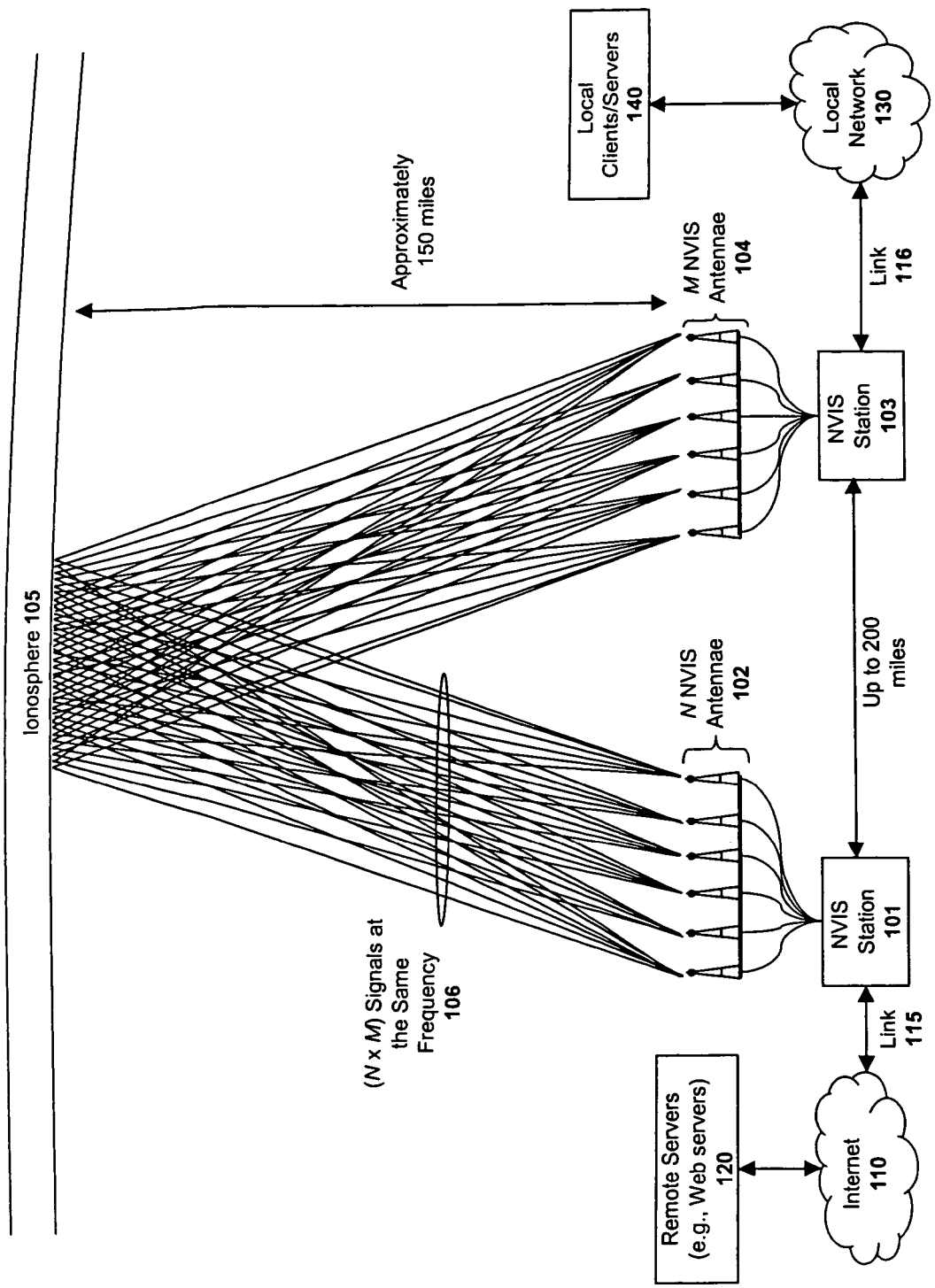
FIG. 2 illustrates one embodiment of the invention in which space-time coding is employed within an NVIS system.
Figure 3:
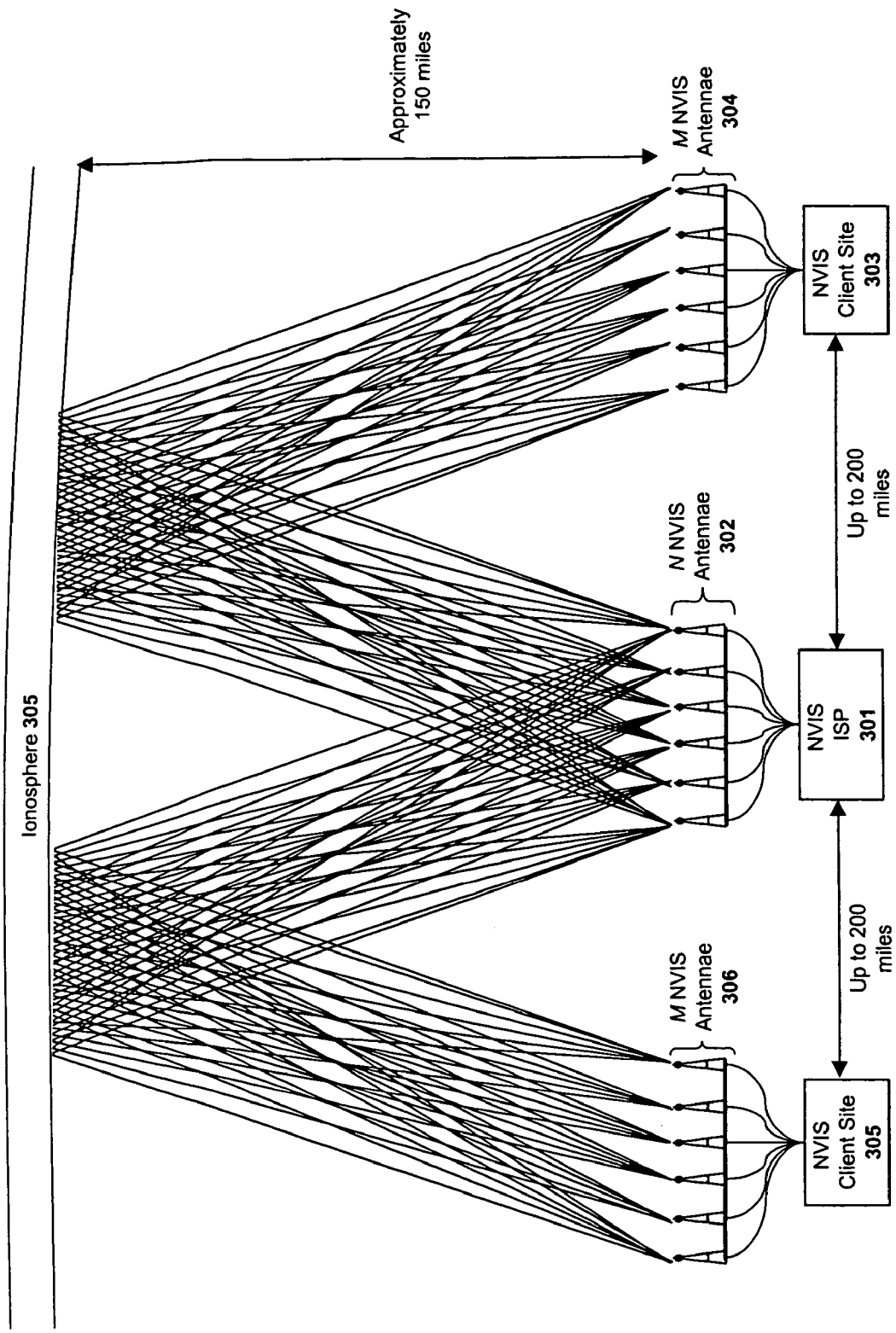
FIG. 3 illustrates an NVIS ISP that provides connectivity to multiple NVIS client sites.
Figure 6:
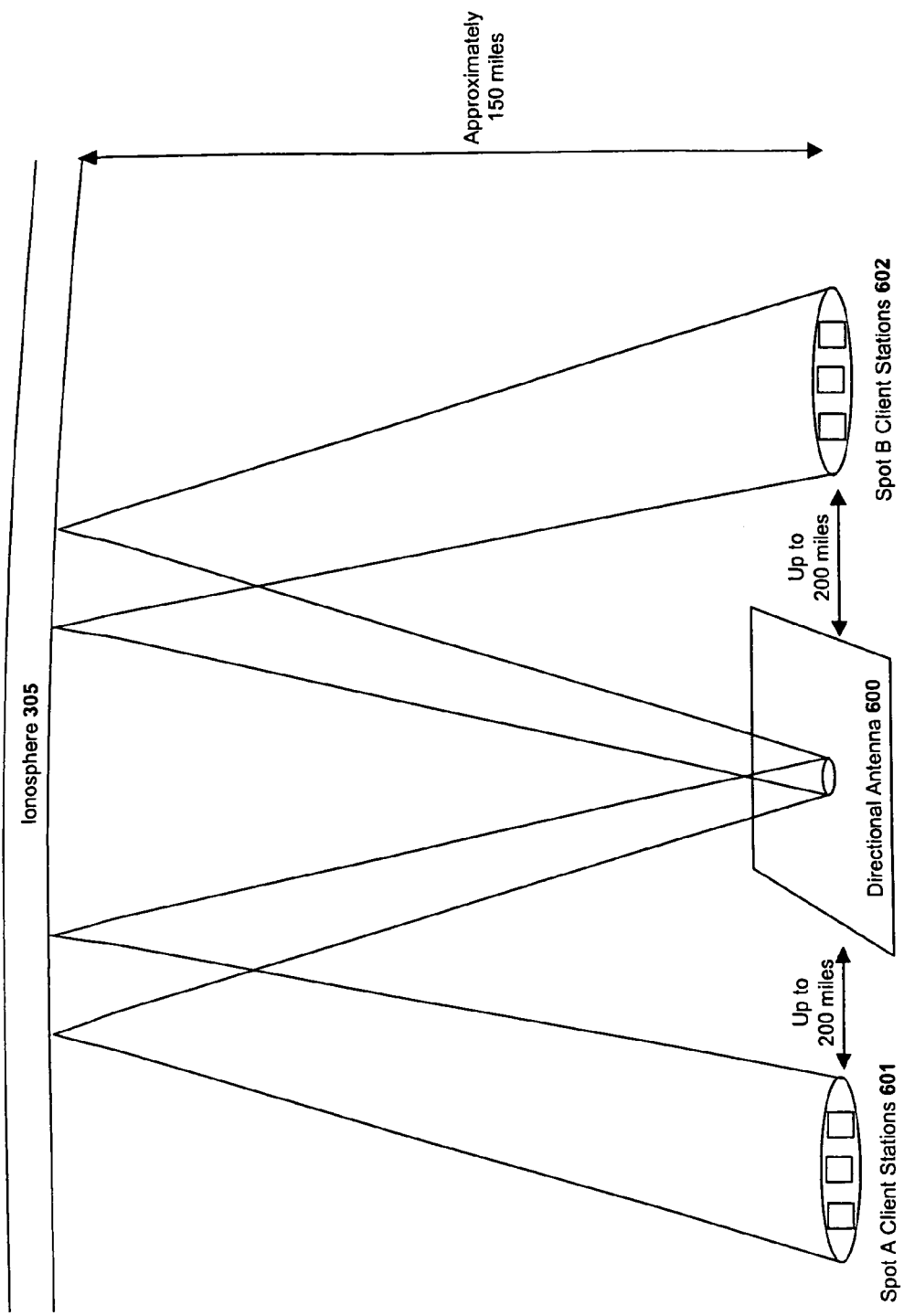
FIG. 6 illustrates an NVIS system that utilizes a directional antenna.

In the particular example shown in FIGS. 2 and 3, for the purpose of illustration, N=M=6, and a one-to-one correspondence exists between each of the N directional antennae 102 and M directional antenna 104, resulting in six statistically independent data streams 106 between NVIS station 101 and NVIS station 103. Although FIG. 6 illustrates a relationship where the output of one antenna is associated with the input of exactly one other antenna, the underlying principles of the invention are not limited to this implementation. As mentioned above, N and M may be different. In addition, there will not necessarily be a path between every Nth and every Mth antenna. Moreover, in a real-world implementation, significantly more than six directional antennae may be used at each NVIS station 101, 103 (e.g. 10500 at each end) resulting in significantly more independent data streams 106 and a significantly higher communications bandwidth. The actual number used will depend on the amount of bandwidth required for a given geographical region. For example, 500 might be needed to provide data bandwidth for a highly populated area, whereas 10 might be sufficient for a rural area with a very sparse population. In implementations where a large number of antennae are required, N may be greater than M because it may be more practical to have more antennae at the server site than at the client site.

In one embodiment, the high speed communication link 115 is an Optical Carrier ("OC")-192 or an OC-768 channel (or plurality of channels) as defined in the SONET specification. However, the communication link 115 may be based on various other signal transmission technologies while still complying with the underlying principles of the invention (e.g., T-3, DS-3, STS channels, . . . etc).

The second NVIS station 103 illustrated in FIG. 2 is coupled to a local area network 103 via a communications link 116 within a local geographical area. As with communications link 115, the communications link 116 coupling the second NVIS station 103 to the local area network 130 (described below) may be based on a variety of different signal transmission technologies. The local area network 130 of this embodiment communicatively interconnects a plurality of local clients and/or servers 140 owned/maintained by various organizations and/or individuals. For example, in one embodiment, the local area network 130 is an Ethernet-based network within a local organization (e.g., a local business, university, . . . etc). In this embodiment, the M NVIS antennae may be positioned on the roof of a building or at any other location in which the antennae are provided with an unobstructed view of the sky (i.e., to receive the NVIS data streams 106 reflected off of the ionosphere 105).

Alternatively, instead of being connected via the local area network 130, the NVIS station 103 may be directly coupled to a personal computer ("PC") or server. For example, in this embodiment, the functional components of the NVIS station 103 may be embedded within a PC card such as a Peripheral Component Interconnect ("PCI") card plugged into a PCI bus slot of a personal computer. Alternatively, the components of the NVIS station 103 may be integrated within an external communication device, capable of communicating with a PC or server via a Universal Serial Bus ("USB"), Firewire™ (IEEE 1394) interface or similar high speed PC interface. It should be noted, of course, the underlying principles of the invention are not limited to any particular interface or communication channel for coupling the NVIS station 103 to local clients/servers 140.

MIMO and diversity systems require substantially statistically independent communications channels in order to significantly increase the channel capacity. Angle of arrival differences of 2 degrees are usually sufficient to give a channel improvement (see, e.g., Reference Data for Radio Engineers, HW Sams Publishers, $5^{th}$ ed., 1973, pp 26-9). In addition, fading intervals of 0.05 to 95 seconds are observed for decorrelation to coefficient values of 0.6 or less.

Two-dimensional channel modulation, that is, using some sort of M-ary modulation (e.g., QAM, or possibly PSK or FSK) produces the following channel model:

$$Y = Hx + z,$$

where each of these quantities is a vector. More specifically, in one embodiment, H is a complex r×t matrix having M rows and N columns with entries $h_{ij}$ describing the gains of each transmission path to a receiver from a transmit antenna. In the matrix, r and t represent the number of receivers and their corresponding antennas and the number of transmitters and their corresponding transmitters, respectively. The variable x is a complex t-vector, consisting of transmitters and their antennas, and the variable y is the corresponding vector of receivers and their antennas, the r-vector. The variable z is a complex noise vector (e.g., an independently-distributed Gaussian random variable with independent real and imaginary parts).

In non-vector notation, this can be stated as:

$$y_j = \sum_{i=1}^{t} h_{ij} x_i + z_j$$

where the ith component of vector x is the signal transmitted from the antenna I and the jth component of vector y is the signal received by antenna j.

Given the foregoing analysis, a variety of different configurations exist, including the following: (1) H is deterministic; (2) H is random, chosen according to some Probability Distribution Function; (3) H is random, but is considered fixed for some code word. The following discussion will focus on case (2). It should be noted, however, that the underlying principles of the invention are not limited to case (2).

One way to solve the matrix H is to insert a null value into a symbol stream (by coding) and to insert a pilot signal into that null value. The pilot may then be detected at the receiver. Doing this allows $h_{ij}$ to be determined for a particular pair. Of course, various other known techniques may be employed while still complying with the underlying principles of the invention.

For Gaussian channels with multiple antennas and with t=r (number of transmit antennas is equal to the number of receive antennas), for every 3 dB increase in SNR there is available t more bits/sec/Hz. If 4 antennas are used on both transmit and receive, doubling the transmit power (on each transmitter) 4 more bits/sec/Hz may be achieved in a Gaussian channel (e.g., an additional 4 kb/s for a 1 kHz channel, or an additional 4 Mb/s for a 1 MHz channel).

Channel State Information ("CSI") is one factor which determines performance. In addition to the pilot tone method of estimating CSI, "channel soundings" may be employed to determine the characteristics of the channel, much like a land-line modem sweeps the telephone channel during communications set-up and adjusts its digital signal processor ("DSP") filters to take best advantage of different telephone circuit conditions.

NVIS is somewhat like a telephone line that is changing its characteristics with time. These changes may occur, at times, on a sub-one-second basis (whereas, at other times, conditions may be relatively stable). In one embodiment of the invention, these changing paths and time constants are dealt with by using CSI.

If pilot symbols used for channel sounding are transmitted along with data symbols, the effective channel rate may be reduced. Thus, there is a tradeoff between system performance and transmission rate.

The optimal training interval independent of the number of transmitters and receivers is ½. Half of the available interval should be used for training (i.e., forming a mathematical model of the H matrix).

If the CSI is made available to the transmitter, very high rates are possible without the need of deep interleaving or HF diversity. Because this, in effect, guarantees reciprocity, in terms of capacity improvement, transmitter antenna diversity is equivalent to receive antenna diversity.

Figure 5:
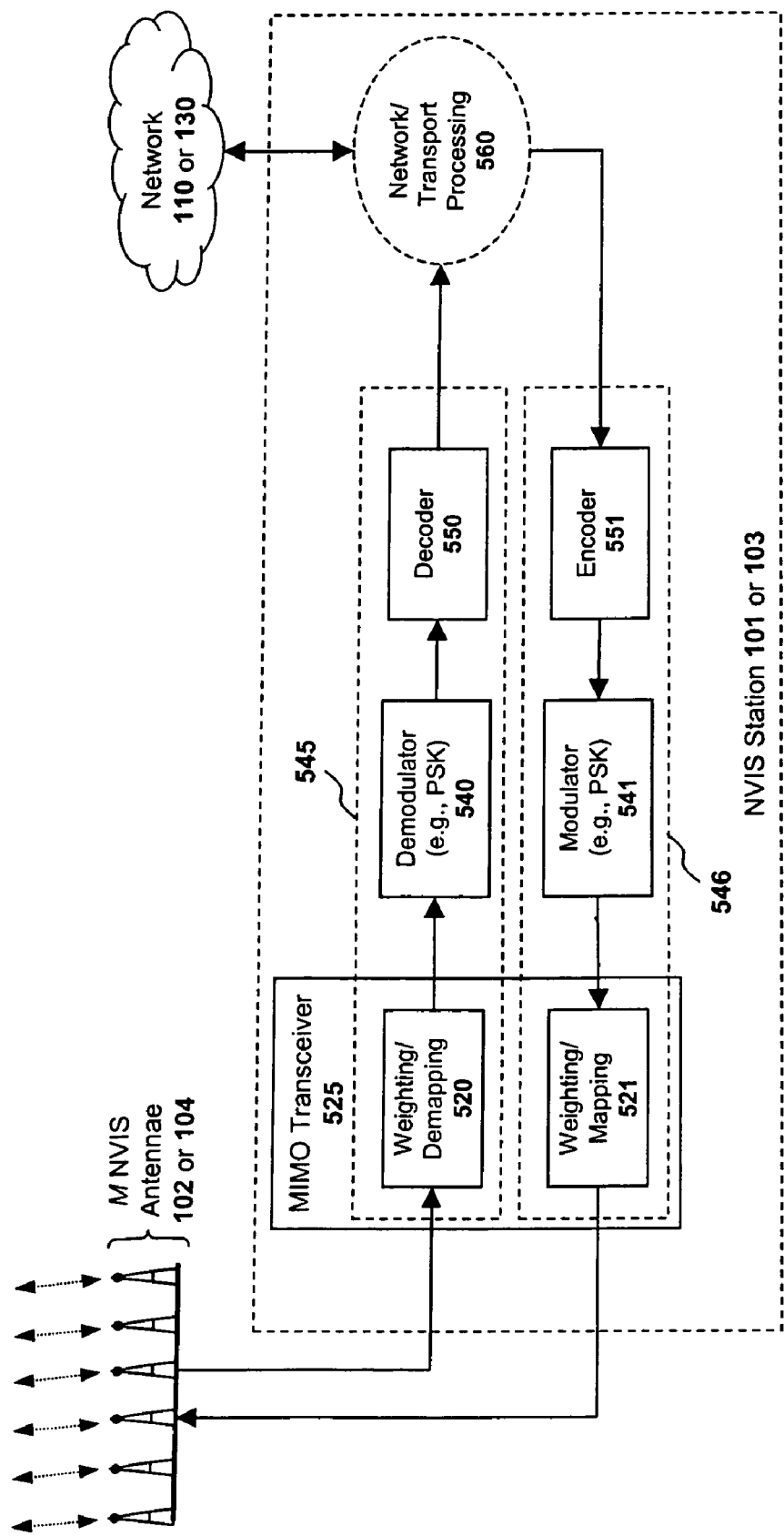
FIG. 5 illustrates a transmitting/receiving station according to one embodiment of the invention.

As illustrated in FIG. 5, one embodiment of an NVIS station 101, 103 includes a signal transmitting pipeline 546 for processing outgoing NVIS data streams and a signal receiving pipeline 545 for processing incoming NVIS data streams. The M antennae for transmit are normally separate from the M' antennae for receive. In one embodiment, network transport processing logic 560 formats incoming and outgoing data streams for distribution across a particular network (e.g., the Internet 110 or a local area network 130) or, alternatively, for direct processing by a personal computer or server. For the purpose of illustration, the NVIS illustrated in FIG. 5 is capable of both transmitting and receiving. It should be noted, however, that the underlying principles of the invention are not limited to an NVIS station capable of bidirectional communication. Moreover, NVIS stations capable of both full duplex and half duplex communication are contemplated within the scope of the invention.

Figure 4:
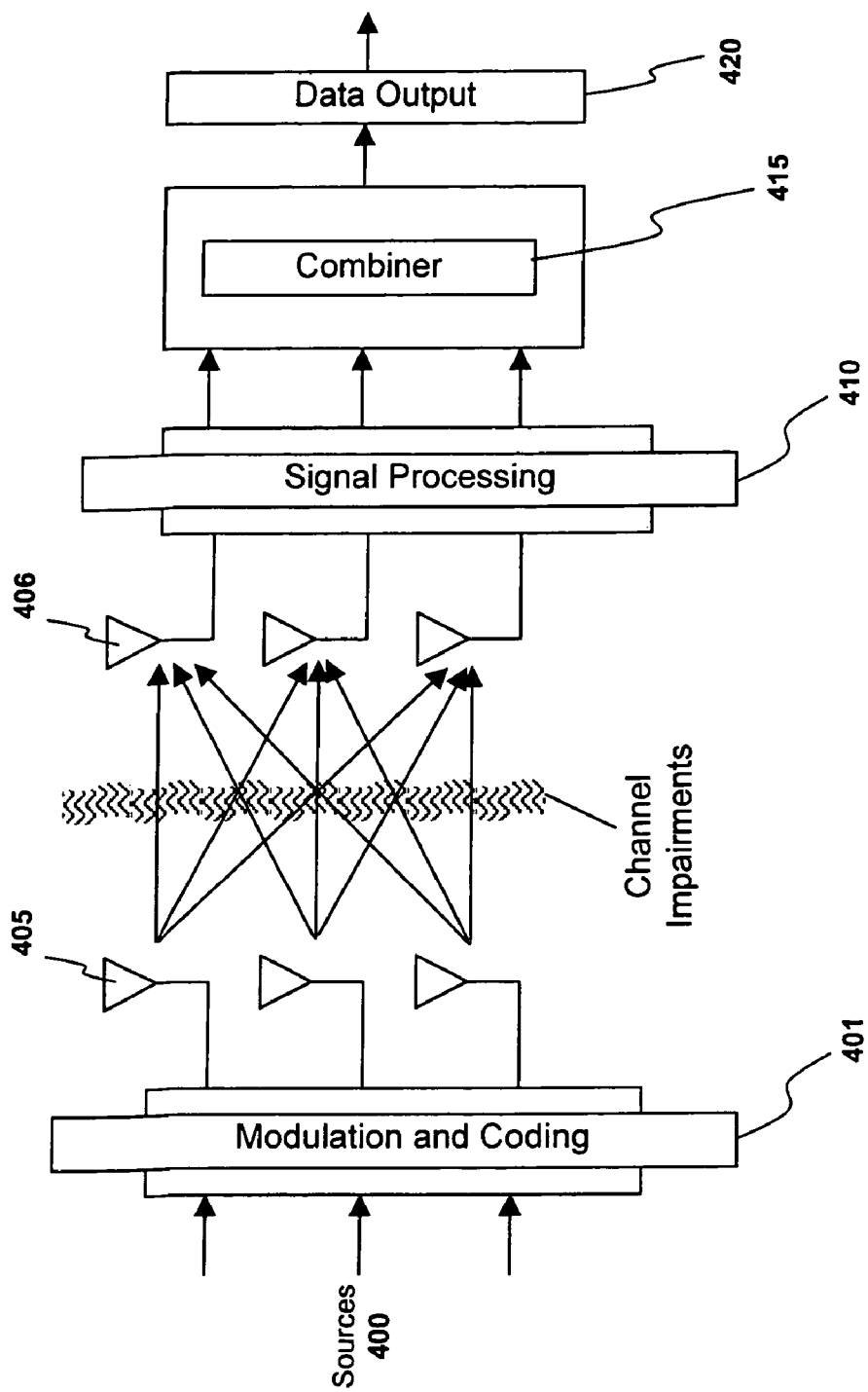
FIG. 4 illustrates data Inputs multiplexed into a modulation and coding engine that converts a single data stream into separate, coded streams for transmission over M transmit antennas.

Another embodiment in FIG. 4 shows data Inputs, coming from a single or multiple source(s) 400, which are then multiplexed into a Modulation and Coding engine 401 that converts a single data stream into separate, coded streams for transmission over the M transmit antennas 405 (3 are shown for illustration purposes, but any number could be used). Multiple energy paths exist between the M transmit antennas 405 and the M' receive antennas 406. There are 3 receive antennas illustrated in FIG. 4, although any number could be used. The number of transmit antennas is not required to be equal to the number of receive antennas. These multiple paths are not the same. We could also say that the channels are not highly correlated. At the Signal Processing section 410 of the Receiver, the independent data streams are extracted from the over-the-air data+channel impairments, and are sent to the Combiner block 415 that reproduces the original data stream into the Data Output 420.

Referring again to FIG. 5, in one embodiment, data provided by network/transport processing logic 560 to signal transmitting pipeline 546 is initially encoded by encoder 551 using one or more channel coding techniques. For example, in one embodiment, encoder 551 is comprised of a block-based error correction coder and/or a forward-error correction coder. By way of example, the block-based error correction coder may be a Reed-Solomon encoder which adds redundant bits to each defined block of data, which may subsequently be used to repair errors in the transmitted signal, or many other types of encoders in space and/or time and/or other appropriate dimensions. The forward error correction coder of one embodiment is a Viterbi encoder which generates an encoded bitstream in which a correlation exists between multiple consecutive transmitted bits. Reed-Solomon, Viterbi, Turbo Codes or other encoding techniques could be employed. Reed-Solomon, Viterbi and Turbo Codes are well known encoding techniques and are not required for complying with the underlying principles of the present invention.

The encoded signal is then provided to a modulator 541 which employs a specified modulation technique on the encoded signal. For example, in one embodiment, a phase-shift key ("PSK") modulation technique is employed to modulate the signal such as quadrature phase-shift key ("QPSK") modulation (currently used by satellite service providers). Various other modulation techniques may also be employed including, by way of example and not limitation, quadrature amplitude modulation ("QAM") or M-QAM. Indeed, OFDM or multi-carrier modulation of any sort may also be used, for example.

The modulated signal is then provided to a MIMO 525 transceiver which launches multiple data streams over the designated MIMO channel at a specified carrier frequency and bandwidth (e.g., 20 MHz). Specifically, in one embodiment, the MIMO transceiver 525 includes a weighting and/or mapping module 521 which maps different sequences of data to particular NVIS antennae 102, 104. For example, if a modulation scheme is employed by modulator 541 which generates complex modulation symbols (e.g., such as QPSK), different complex modulation symbols may be mapped to different antennae. Moreover, depending on the modulation scheme and the mapping techniques employed, the different "independent" data streams may be fully independent, partially independent (e.g., certain symbols may depend on other symbols), or fully redundant (e.g., the same data may be transmitted from two or more antennae); they may also be delayed relative to one another. However, if practical, given the NVIS channel characteristics, fully independent data streams will result in higher overall bandwidth than partially independent or fully redundant data streams. In addition, the weighting/mapping module may provide spatial weighting of the different antenna elements and/or may perform linear antenna space-time precoding.

The transmitted signal is then received and processed by the signal receiving pipeline 545 within a different NVIS station (e.g., station 103). Specifically, a weighting/demapping module 520 within the transceiver 525 reconstructs the signal by combining the data encapsulated within the different data streams 106 in the correct order (i.e., based on the order in which they were mapped to the different antennae 102, 104). For example, if a portion of the data stream following modulation was comprised of the symbols b1, b2, b3, in succession, and each symbol is transmitted in a different independent data stream, then the weighting/demapping logic 520 at the receiving station must reconstruct the original order prior to demodulation (e.g., by storing symbol b2 until b1 is received and/or by storing symbol b3 until b2 and b1 are received). A memory such as an input buffer comprised of synchronous dynamic RAM ("SDRAM") may be employed to store a portions of the data stream while awaiting for the arrival of a prior portions of the data stream.

In certain embodiments where CSI is not pre-known, some of the symbols received would be used purely to estimate the Channel Impairments, and would be removed from the coded data stream(s) before being Combined into the Output Data Stream.

The reconstructed signal is then demodulated by a demodulator 540. The demodulation technique employed by the demodulator 540 is based on the particular modulation scheme employed at the transmitting end (i.e., by modulator 541). For example, if QPSK modulation is employed by modulator 541, then QPSK demodulation must be employed by demodulator 540.

The demodulated signal is then provided to a decoder 140 (or other type of forward-error-correction decoder) which attempts to correct bit errors caused by signal noise. For example, if Viterbi decoding was employed at the encoder, then the Viterbi portion of the decoder 550 determines the most likely transmitted bit sequence using a statistical correlation of the bit sequence actually received by the system, according to the Viterbi algorithm. Accordingly, the original bit sequence may be reconstructed, even in the presence of a significant amount of noise.

In addition, if Reed-Solomon encoding is employed at the encoder 551, the Reed-Solomon section of the decoder 550 attempts to correct any errors and recover the original data. As it is known in the art, the number and type of errors that can be corrected depends on the characteristics of the particular Reed-Solomon code employed. However, as mentioned above, the particular type of error correction coding employed is not pertinent to the underlying principles of the invention.

Once mapping, demodulation and decoding are complete, the raw data stream is processed by network/transport processing logic 560 according to the particular network/transport protocol employed. For example, transmission control protocol ("TCP") packets may be routed across a local area network 130 by a gateway or similar device according to the well known TCP/IP protocol. If the underlying data stream contains multimedia data such as an MPEG transport stream, then the transport stream is distributed and processed accordingly. For example, if the MPEG stream is an MPEG-2 stream, then it may be decoded by an MPEG-2 decoder and rendered on a computer or television display. Various other processing techniques may be employed by the network/transport processing logic while still complying with the underling principles of the invention.

Although MIMO will dramatically increase the channel bandwidth of an NVIS system, a roughly linear increase in antennae is needed for a linear increase in bandwidth. A conventional NVIS antenna system will typically provide coverage over a 200 mile radius. A 200 mile radius in a rural area may only encompass hundreds or thousands of potential users, but in a densely-populated area, it could encompass millions of users. So many users could potentially swamp the practically achievable bandwidth, given the physical number of antennae that would be required.

Another embodiment of the present invention addresses this issue. FIG. 6 shows an NVIS system utilizing a highly directional antenna 600. A typical NVIS antenna is directional to within about 15 degrees of each side of vertical (a 30-degree radius). The directional antenna 600 shown in FIG. 6 would steer a narrower beam within that 30 degree radius, and as a result the signal bouncing off the ionosphere would hit a smaller spot on the ground than the entire 200 miles radius of normal NVIS coverage. Such an antenna 600 can be accomplished using any of a number of prior art beam steering techniques. For example, Vivato, Inc. (http://www.vivato.net) offers a phased arrayed antenna in the ISM 2.4 GHz band that supports beam-steered WiFi connections. In the HF band, an example of a beam-steering phased-array antenna has been implemented by the High Frequency Active Auroral Research Program (HMRP) in Alaska (www.haarp.alask.edu). The HAARP Phased Array antennas, like those of the presently described embodiment, is implemented by a number of antenna elements distributed over a relative large area of land (from 100s of yards to 10s of miles).

FIG. 6 also illustrates another property of a phased-array directional antenna: its ability to transmit more than one steered beam at once. FIG. 6 shows two simultaneous beams being steered by the directional antenna to create two spots at two different locations on the ground, each spot providing coverage to a different set of client stations 601, 602. With appropriate beam shaping signal processing using prior art techniques, a phased-array antenna can transmit any number of shaped beams at once. For example, a single Vivato phased array antenna system is capable of transmitting and receiving multiple shaped beams. The beams can be at the same or different frequencies, and they can be of the same size and shape, up to the limitations of the antenna array and the signal processing system driving it. By having more than one spot of coverage, a given NVIS system can increase its overall bandwidth capacity by utilizing the same frequencies in more than one area. Various additional communication and signal processing techniques may be employed to implement the embodiments of the invention set forth herein including, by way of example, innovative phasing, programmable phase sections, DSP pre-distortion.

At frequencies relevant for NVIS, the wavelengths are quite long, and as a result very large phased-array antennas may be used for shaping narrow beams. Assume that the wavelength is about 100 meters, H=100 miles, and that D is the transmitter antenna aperture size. The transmitter aperture that will make a 25-km (40 mile) diameter spot S at the receiver may be calculated, solving for D using the following equation:

$$D = \frac{4 \times 1.2 \times H \times \lambda}{S} \cong \frac{4.8[100 \text{ miles}][100 \text{ meters}]}{40 \text{ km}} \approx 1.2 \text{ miles}$$

(Note that the meters in the above equation cancel, leaving miles).

A 1.2-mile long phased-array antenna could be physically implemented by distributing small antennas over a large, relatively flat area.

Figure 7:
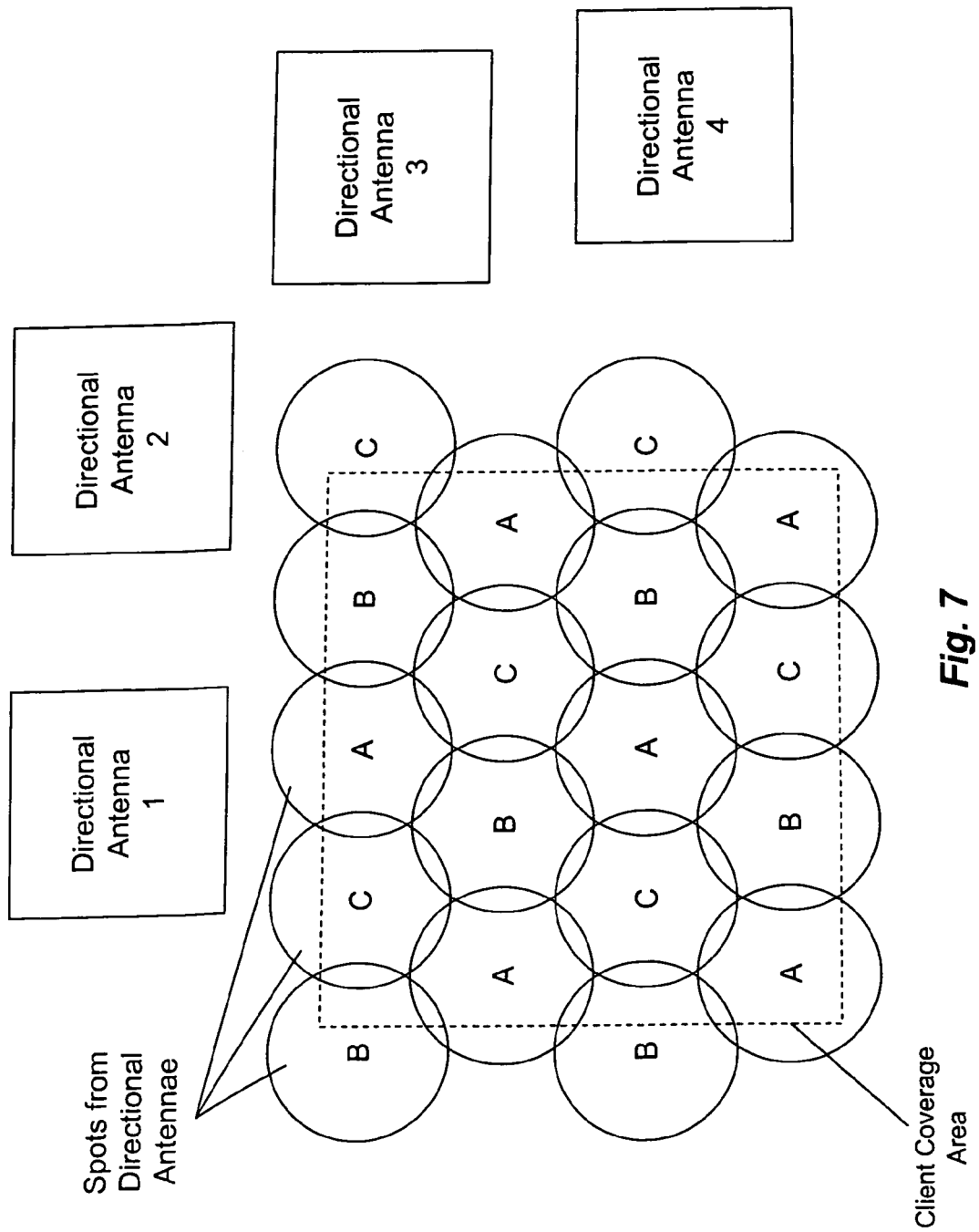
FIG. 7 illustrates how directional antennae can be used to create cells overlapping a desired coverage area.

FIG. 7 shows a view from above of how directional antennae can be used to create cells overlapping a desired coverage area. Each of the cells in this example is one of 3 frequencies, A, B, and C, such that no overlapping cells are at the same frequency. Direction Antenna 1 would be configured to transmit shaped beams upward to the ionosphere, and they would reflect down to the ground in the cellular pattern shown. Directional Antennae 2, 3, and 4 would transmit shaped beams that, after reflecting off the ionosphere, would hit the ground at the same locations and same frequencies as the spots created by Directional Antenna 1. In this way, the four spatially diverse, overlapping signals would provide the diversity needed to implement MIMO as previously described.

Figure 8:
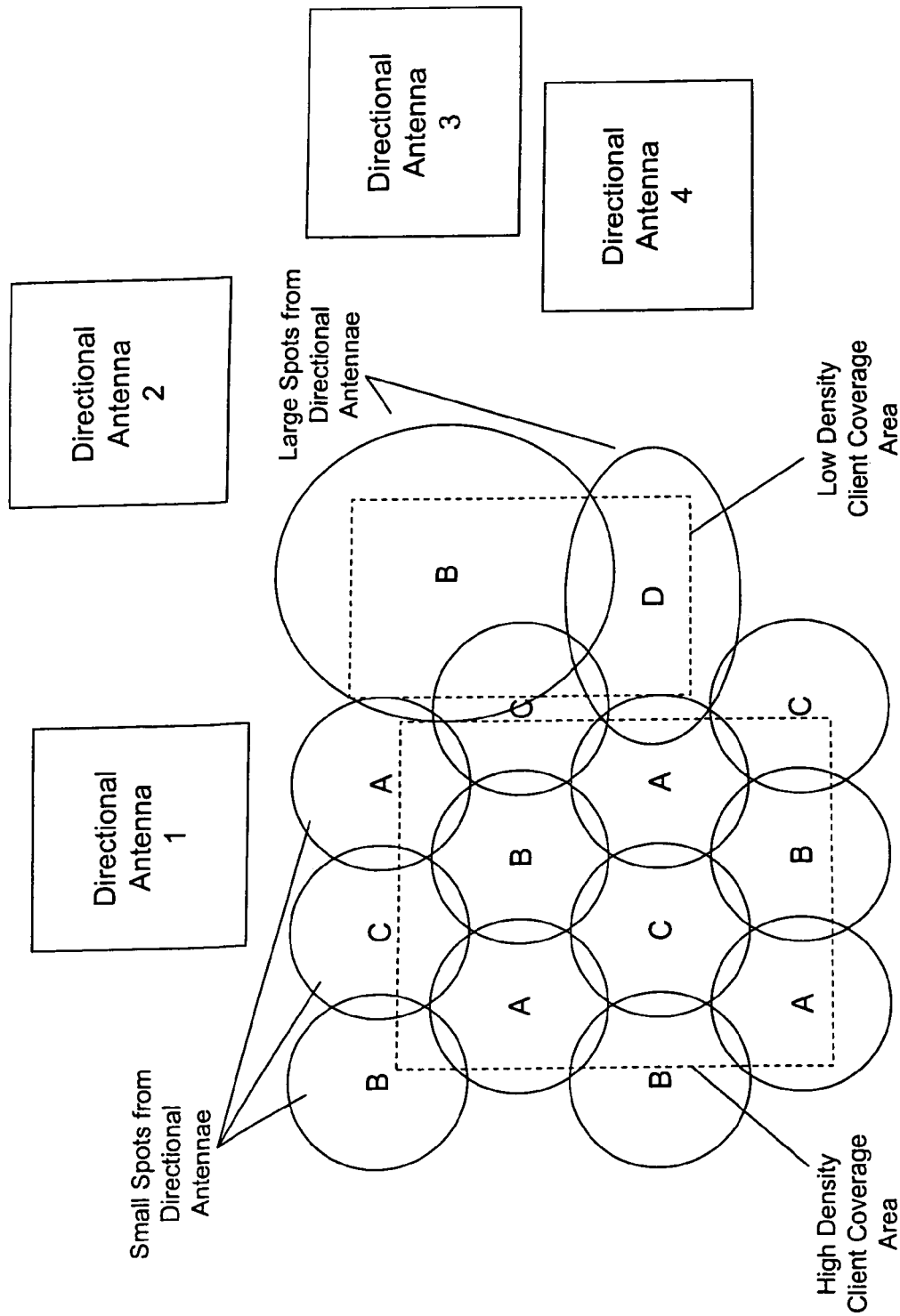
FIG. 8 illustrates another embodiment of the invention in which the desired client coverage areas are of varying density in terms of bandwidth requirements.

FIG. 8 shows yet another embodiment of the invention in which the desired client coverage areas are of varying density in terms of bandwidth requirements. In the high density coverage area where there is a higher bandwidth requirement per unit area, the Directional Antennae are configured to make smaller spots. In the lower density coverage area in terms of bandwidth requirements, the Directional Antennae are configured to provide larger spots. Note that the spots created by Directional Antennae are not necessarily round or of uniform shape. Different shapes may be exploited to best fit the bandwidth needs of the areas requiring coverage.

Embodiments of the invention may include various steps as set forth above. The steps may be embodied in machine-executable instructions which cause a general-purpose or special-purpose processor to perform certain steps. For example, the various components within the NVIS stations

101, 103 illustrated in FIG. 5 may be coupled to a PCI bus or other bus within a personal computer. To avoid obscuring the pertinent aspects of the invention, various well known personal computer components such as computer memory, hard drive, input devices, . . . etc, have been left out of the figures.

Alternatively, in one embodiment, the various functional modules illustrated herein and the associated steps may be performed by specific hardware components that contain hardwired logic for performing the steps, such as an application-specific integrated circuit ("ASIC") or by any combination of programmed computer components and custom hardware components.

In one embodiment, certain modules illustrated in FIG. 5 (e.g., weighting/demapping logic 520, demodulator 540, decoder 550) may be implemented on a programmable digital signal processor ("DSP") such as a DSP using a Texas Instruments' TMS320x architecture (e.g., a TMS320C6000, TMS320C5000, . . . etc). The DSP in this embodiment may be embedded within an add-on card to a personal computer such as, for example, a PCI card. Various different DSP architectures may be used while still complying with the underlying principles of the invention.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the present system and method. It will be apparent, however, to one skilled in the art that the system and method may be practiced without some of these specific details. Accordingly, the scope and spirit of the present invention should be judged in terms of the claims which follow.

What is claimed is:

1. A method implemented within a near vertical incidence skywave ("NVIS") communication system comprising:
    transmitting pilot signals and data signals from a first plurality of directional antennas of a multi-antenna transceiver at near vertical incidence within a frequency range to cause the pilot signals and data signals to reflect off of the ionosphere towards a near vertical incidence skywave ("NVIS") receiver system having a second plurality of directional antennas;
    estimating channel state information ("CSI") for the communication channels using the pilot signals, and responsively generating channel characterization data comprising at least N*M components, where N represents a number of the first plurality of directional antennas of the multi-antenna transceiver and M represents a number of the second plurality of directional antennas of the NVIS receiver system, wherein the N antennas of the multi-antenna transceiver are used to communicate with the M antennas on the NVIS receiver system, each of the N*M components defining a gain over each transmission path between each one of the N antennas of the multi-antenna transceiver and each one of the M antennas on the NVIS receiver system;
    storing the channel characterization data including the N*M components;
    receiving a data stream to be transmitted wirelessly over one or more communication channels in response to a client request;
    coding the data stream with space-time coding techniques to create multiple statistically independent pre-coded data streams, wherein coding the data stream with space-time coding techniques comprises using each of the N*M components of the channel characterization data to pre-code each of the data streams prior to transmission from each of the antennas;
    mapping each of the pre-coded data streams to a particular antenna of the N directional antennas of the multi-antenna transceiver; and
    thereafter transmitting the multiple pre-coded data streams and additional pilot signals from each of the N directional antennas of the multi-antenna transceiver at near vertical incidence within a frequency range to cause the transmitted pre-coded data streams and pilot signals to reflect off of the ionosphere towards the near vertical incidence skywave ("NVIS") receiver system having the M directional antennas;
    continuing to measure the characteristics of the communication channels during transmission of the pre-coded data streams on a sub-one second basis to arrive at sub-one-second estimates for CSI and, in response, continually adjusting each of the N*M components of the channel characterization data; and
    continually adjusting the coding of the data streams between each one of the N antennas of the multi-antenna transceiver and each one of the M antennas on the NVIS receiver system on a sub-one-second basis based on the continually adjusted N*M components.

2. The method as in claim 1 wherein the space-time coding techniques comprise multiple-input multiple-output ("MIMO") signal communication techniques.

3. The method as in claim 1 further comprising:
    retrieving data from a Web server responsive to a user request to retrieve the data; and
    providing the data from the Web server to two or more of the multiple data streams.

4. The method as in claim 3 further comprising:
    receiving the data from the Web server at a remote NVIS receiving station; and
    distributing the data to one or more remote servers and/or clients.

5. The method as in claim 3 wherein the data from the Web server comprises a Web page with embedded links to other Web servers, the method further comprising:
    retrieving data from the other Web servers responsive to detecting the embedded links; and
    providing the data from the other Web servers to the two or more of the multiple data streams.

6. The method as in claim 1 wherein the space-time coding techniques code the data streams to be statistically independent data streams.

7. The method as in claim 1 wherein the channel state information is stored as a matrix H comprised of separate components measured for each transmit antenna.

8. The method as in claim 1 wherein using each of the N*M components of the channel characterization data to pre-code each of the data streams comprises providing spatial weighting of each of the antennas and/or linear antenna space time precoding.

9. A near vertical incidence skywave ("NVIS") communication system comprising:

a network link to receive a data stream over a network, the data stream to be transmitted wirelessly over one or more communication channels in response to a client request;

a space-time coding module to transmit pilot signals and data signals from a first plurality of directional antennas of a multi-antenna transceiver at near vertical incidence within a frequency range to cause the pilot signals and data signals to reflect off of the ionosphere towards a near vertical incidence skywave ("NVIS") receiver system having a second plurality of directional antennas;

the space time coding module estimating channel state information ("CSI") for the communication channels using the pilot signals, and responsively generating channel characterization data comprising at least N*M components, where N represents a number of the first plurality of directional antennas of the multi-antenna transceiver and M represents a number of the second plurality of directional antennas of the NVIS receiver system, wherein the N antennas of the multi-antenna transceiver are used to communicate with the M antennas on the NVIS receiver system, each of the N*M components defining a gain over each transmission path between each one of the N antennas of the multi-antenna transceiver and each one of the M antennas on the NVIS receiver system;

the space time coding module storing the channel characterization data including the N*M components in a memory;

the space-time coding module to receive a data stream to be transmitted wirelessly over one or more communication channels in response to a client request and to code the data stream using space-time coding techniques to create multiple statistically independent pre-coded data streams, and to use each of the N*M components of the channel characterization data to pre-code each of the data streams prior to transmission from each of the antennas;

the space-time coding module further to map each of the pre-coded data streams to a particular antenna of the N directional antennas of the multi-antenna transceiver; and thereafter transmit the multiple pre-coded data streams and additional pilot signals from each of the N directional antennas of the multi-antenna transceiver at near vertical incidence within a frequency range to cause the transmitted data streams and pilot signals to reflect off of the ionosphere towards the near vertical incidence skywave ("NVIS") receiver system having the M directional antenna; and to continue to measure the characteristics of the communication channels during transmission of the pre-coded data streams on a sub-one second basis to arrive at sub-one-second estimates for CSI and to continually adjust each of the N*M components of the channel characterization data; and to continually adjust the coding of the data streams between each one of the N antennas of the multi-antenna transceiver and each one of the M antennas on the NVIS receiver system on a sub-one-second basis based on the continually adjusted N*M components.

10. The system as in claim 9 wherein the space-time coding techniques comprise multiple-input multiple-output ("MIMO") signal communication techniques and the space-time coding module is a MIMO space-time coding module.

11. The system as in claim 9 wherein one or more of the directional antennae further receive one or more of the multiple data streams reflected from the ionosphere, the one or more of the multiple data streams having previously been transmitted from another NVIS station.

12. The system as in claim 9 further comprising:
a network link communicatively coupling the NVIS communication system to the Internet, the NVIS communication system retrieving data from a Web server over the network link responsive to a user request to retrieve the data; and providing the data from the Web server to two or more of the multiple data streams.

13. The system as in claim 12 further comprising:
the NVIS receiver system to receive the data from the Web server; and
a second communication link over which the NVIS receiver system distributes the data to one or more remote servers and/or clients.

14. The system as in claim 9 wherein the space-time coding techniques code the data streams to be statistically independent data streams.

15. The system as in claim 9 wherein the channel state information is stored as a matrix H of the N*M components including separate components measured for each transmit antenna.

16. The system as in claim 9 wherein using each of the N*M components of the channel characterization data to pre-code each of the data streams comprises providing spatial weighting of each of the antennas and/or linear antenna space time precoding.

17. An apparatus comprising:
a signal transmitting pipeline having a space-time coding module to transmit pilot signals and data signals from a first plurality of directional antennas of a multi-antenna transceiver at near vertical incidence within a frequency range to cause the pilot signals and data signals to reflect off of the ionosphere towards a near vertical incidence skywave ("NVIS") receiver system having a second plurality of directional antennas, the NVIS receiver system estimating channel state information ("CSI") for the communication channels using the pilot signals, and responsively generating channel characterization data comprising at least N*M components, where N represents a number of the first plurality of directional antennas of the multi-antenna transceiver and M represents a number of the second plurality of directional antennas of the NVIS receiver system, wherein the N antennas of the multi-antenna transceiver are used to communicate with the M antennas on the NVIS receiver system, each of the N*M components defining a gain over each transmission path between each one of the N antennas of the multi-antenna transceiver and each one of the M antennas on the NVIS receiver system;

the space time coding module storing the channel characterization data including the N*M components in a memory;

the space-time coding module to receive a first plurality of data streams to be transmitted wirelessly over one or more communication channels in response to a client request and to encode the first plurality of data streams using space-time coding techniques to create multiple statistically independent pre-coded data streams and to concurrently transmit the multiple statistically independent pre-coded data streams within a common frequency band via a respective plurality of directional antennae over one or more communication channels; wherein the space-time coding techniques further include using each of the N*M components of the channel characterization data to pre-code each of the data streams prior to transmission from each of the N directional antennas, the N directional antennae to concurrently transmit the first plurality of data streams towards the ionosphere of the earth, the frequency band selected to cause the transmitted data streams to reflect off of the ionosphere, the space-time encoding module including mapping logic to map each of the statistically independent pre-coded data streams to a particular antenna of the N directional antennae prior to transmitting; wherein the signal transmitting pipeline continues to measure the characteristics of the communication channels during transmission of the pre-coded data streams on a sub-one second basis to arrive at sub-one-second estimates for CSI and continues to adjust each of the N*M components of the channel characterization data and continues to adjust the pre-coding of the data streams between each one of the N antennas of the multi-antenna transceiver and each one of the M antennas on the NVIS receiver system on a sub-one-second basis based on the continually adjusted N*M components; and a signal receiving pipeline having a space-time decoding module to each of the statistically independent pre-coded data streams within the common frequency band via a respective plurality of directional antennae and to decode each of the statistically independent pre-coded data streams using space-time decoding techniques, the plurality of directional antennae to concurrently receive each of the statistically independent pre-coded data streams from the ionosphere of the earth, the space time decoding module including demapping logic to receive each of the statistically independent pre-coded data streams from a different antennae and to reconstruct a series of consecutive data blocks from each of the statistically independent pre-coded data streams.

18. The apparatus as in claim 17 wherein the space-time encoding module comprises a multiple-input multiple-output ("MIMO") encoding module and wherein the space-time decoding module comprises a MIMO decoding module.

19. The apparatus as in claim 17 further comprising:
a modulator to modulate first data from a first data source to generate the first series of consecutive data blocks using a specified modulation technique; and
a demodulator to demodulate the second series of consecutive data blocks to generate second data using a specified demodulation technique.

20. The apparatus as in claim 19 wherein each of the data blocks in the first series and the second series comprise complex modulation symbols generated by the specified modulation technique.

21. The apparatus as in claim 19 further comprising:
an encoder module to encode the first data from the first data source using specified data encoding techniques prior to the modulator modulating the first data; and
a decoder module to decode the second data demodulated by the demodulator using specified data decoding techniques.

22. The apparatus as in claim 21 wherein one of the specified encoding and decoding techniques comprise Viterbi encoding and decoding, respectively.

23. The apparatus as in claim 22 wherein another of the specified encoding and decoding techniques comprise Reed-Solomon encoding and decoding, respectively.

24. The system as in claim 17 wherein the space-time coding techniques code the data streams to be statistically independent data streams.

25. The system as in claim 17 wherein the channel state information is stored as a matrix H of the N*M components including separate components measured for each transmit antenna.

26. The system as in claim 17 wherein using each of the N*M components of the channel characterization data to pre-code each of the data streams comprises providing spatial weighting of each of the directional antennas and/or linear antenna space time precoding.

* * * * *